(12) United States Patent
Sonnenberg

(10) Patent No.: US 6,710,094 B2
(45) Date of Patent: Mar. 23, 2004

(54) PROCESSES FOR PREPARING PATTERNS FOR USE IN METAL CASTINGS

(75) Inventor: Fred Sonnenberg, Fort Worth, TX (US)

(73) Assignee: StyroChem Delaware, Inc., Wilmington, DE (US)

(*) Notice: Subject to any disclaimer, the term of this patent is extended or adjusted under 35 U.S.C. 154(b) by 0 days.

(21) Appl. No.: 10/322,404

(22) Filed: Dec. 17, 2002

(65) Prior Publication Data

US 2003/0141031 A1 Jul. 31, 2003

Related U.S. Application Data

(63) Continuation-in-part of application No. 10/054,258, filed on Jan. 22, 2002, now Pat. No. 6,497,269, which is a continuation of application No. 09/828,408, filed on Apr. 6, 2001, now Pat. No. 6,360,807, which is a continuation-in-part of application No. 09/473,606, filed on Dec. 29, 1999, now abandoned.

(51) Int. Cl.$^7$ .............................. C08J 9/18; B22C 7/00
(52) U.S. Cl. ..................... 521/56; 164/45; 164/523; 164/524; 164/526; 164/34; 521/98; 521/907
(58) Field of Search ..................... 521/56, 98, 907, 521/149, 60; 164/34, 45, 523, 524, 526

(56) References Cited

U.S. PATENT DOCUMENTS

| | | | |
|---|---|---|---|
| 2,673,194 A | 3/1954 | Grim | |
| 3,572,421 A | 3/1971 | Mezey et al. | |
| 3,755,209 A | 8/1973 | Nintz et al. | |
| 3,842,899 A | 10/1974 | Hauser-Lienhard | |
| 3,861,447 A | 1/1975 | Hondo | |
| 3,975,327 A | 8/1976 | Nintz et al. | |
| 4,028,285 A | 6/1977 | Pillar | |
| 4,085,169 A | 4/1978 | Saito et al. | |
| 4,091,054 A | 5/1978 | Saito et al. | |
| 4,113,672 A | 9/1978 | Pillar | |
| 4,169,193 A | 9/1979 | Biglione et al. | |
| 4,169,828 A | 10/1979 | Wright | |
| 4,281,067 A | 7/1981 | Kienzle et al. | |
| 4,286,071 A | 8/1981 | Rigler et al. | |
| 4,333,969 A | 6/1982 | Wright et al. | |
| 4,448,235 A | 5/1984 | Bishop | |
| 4,482,000 A | 11/1984 | Reuter | |
| 4,612,968 A | 9/1986 | Ashton et al. | |
| 4,763,715 A | 8/1988 | Cannarsa et al. | |
| 4,773,466 A | 9/1988 | Cannarsa et al. | |
| 4,927,858 A | 5/1990 | Joyce et al. | |
| 4,933,412 A | 6/1990 | Ito et al. | |
| 4,980,382 A | 12/1990 | Sonnenberg et al. | |
| 4,994,499 A | 2/1991 | Sonnenberg et al. | |
| 5,115,066 A | 5/1992 | Zimmermann et al. | |
| 5,147,937 A | 9/1992 | Frazza et al. | |
| 5,935,645 A | 8/1999 | Anfuso et al. | |
| 6,303,664 B1 * | 10/2001 | Sonnenberg et al. | |
| 6,497,269 B2 * | 12/2002 | Sonnenberg et al. | |

OTHER PUBLICATIONS

Del Gaudio, et al., Aspects Concerning the Role of Coatings in the Production of Iron Castings by the "Policast" Process, *Metallurgical Science and Technology*, vol. 3, pp. 76–86 (1985).

E.H. Neimann, Expandable Polystyrene Pattern Material for the Lost Foam Process, *AFS Transactions*, pp. 793–798.

Edwin Niemann, Mechanical & Physical Properties of Foams—Engineering Data (1990).

Askeland, Donald R., Metal Flow in the EPC Process, *Expendable Pattern (Lost Foam) Process*, University of Missouri–Rolla, Nov., 1990, pp. 151–167.

* cited by examiner

*Primary Examiner*—Morton Foelak
(74) *Attorney, Agent, or Firm*—Duane Morris LLP

(57) ABSTRACT

The present invention is directed to processes for forming styrenic polymers, and their related end uses. In particular, the present invention is directed to processes for preparing patterns for use in metal castings.

14 Claims, No Drawings

PROCESSES FOR PREPARING PATTERNS FOR USE IN METAL CASTINGS

REFERENCE TO RELATED APPLICATION

This application is a continuation-in-part of U.S. patent application Ser. No. 10/054,258 filed Jan. 22, 2002 now U.S. Pat. No. 6,497,269, which is a continuation of U.S. patent application Ser. No. 09/828,408, filed Apr. 6, 2001 now U.S. Pat. No. 6,360,807, which is a continuation-in-part of U.S. patent application Ser. No. 09/473,606 filed Dec. 29, 1999 now abandoned, the disclosure of which is hereby incorporated herein by reference in its entirety.

FIELD OF THE INVENTION

The present invention is directed to processes for forming styrenic copolymers, and their related end uses. In particular, the present invention is directed to processes for preparing patterns for use in metal castings.

BACKGROUND OF THE INVENTION

Styrenic polymers have a wide variety of applications, including the formation of expanded polystyrene which can be used to make a variety of products. Processes for forming styrenic polymers include emulsion polymerization, suspension polymerization, and the use of particular suspensions or emulsion aids.

Polymer particles are useful in applications such as the formation of expanded resins, for example, expanded polystyrene. Expanded polystyrene and other expanded resins can be prepared from expandable polymeric particles made by contacting the polymeric particles with a volatile compound known as a "blowing agent" or "expanding agent". Such agents include aliphatic hydrocarbons such as butane, pentanes, hexanes, and halogenated hydrocarbons such as trichloromethane, trichlorofluoromethane, and methyl chloride. The particles in contact with the expanding agent may be expanded by heating, or by exposure to reduced pressure as in a vacuum. The size and size distribution of the expanded particles will depend upon the size and size distribution of the expandable beads.

Expanded and expandable polymeric resins have applications in packaging, consumer products, and in materials processing. Examples of materials processing applications for expanded polymeric resins include so-called "lost foam casting", also called "evaporative pattern casting". In lost foam casting, molten metal is poured into a pattern made of expanded polymeric material, i.e. a foam, coated with a refractory material surrounded and supported by unbounded sand. The foam is decomposed by the heat of the molten metal and replaced by the metal.

A need remains for new and/or improved processes for forming styrenic polymers, as well as for related improvements in lost foam casting applications.

SUMMARY OF THE INVENTION

The present invention is related to a process for the preparation of a vinyl aromatic polymer, e.g., a polystyrene suitable for lost foam casting applications. Pre-expanded beads (prepuff) prepared from polystyrene containing an effective amount of a combination of a bromine-attached aliphatic or aromatic flame retardant and optionally dicumyl peroxide can be used in conventional steam molding equipment to produce low density patterns. Aluminum castings made from the polystyrene/combination material show significantly less signs of carbon deposits, although any metal may be benefited by the technology of the present invention. The polystyrene smoothly and controllably decomposes to give a smooth, clean metal casting.

The vinyl aromatic polymer particles suitable for use in the process of this invention may be spherical or irregularly shaped particles of any of the thermoplastic vinyl aromatic polymers usable in the preparation of molded foam articles. Although homopolymers or copolymers of any vinyl aromatic monomer may be employed, styrene and substituted styrene monomers are preferred. Examples of suitable vinyl aromatic monomers include, but are not limited to, styrene, α-methyl styrene, aryl-methyl styrene, aryl-ethyl styrene, aryl-isopropyl styrene, aryl-tert-butyl styrene, vinyl toluene, vinyl xylene, aryl-chlorostyrene, aryl-chloromethylstyrene, vinyl napthalene, divinyl benzene, and the like. Minor amounts (i.e., up to about 50 mole percent) of other ethylenically unsaturated copolymerizable monomers may also be used, including, for example, butadiene, acrylic acid, methacrylic acid, maleic anhydride, methyl methacrylate, acrylonitrile, and the like. The vinyl aromatic polymer may be rubber modified with an elastomer such as polybutadiene or styrene/butadiene block or random copolymers. The vinyl aromatic polymer particles should preferably be from about 0.1 to 2 mm in average diameter. Methods of obtaining suitable particles such as suspension polymerization or pelletization are well known in the art.

The polymers useful in the present invention include polystyrene having a molecular weight of 150,000 to 350,000, preferably from about 170,000 to 320,000. Small spherical beads of polymer having bead diameters between 100 and 600 microns, preferably between 150–500 microns, and most preferably between 250–425 microns are useful for purposes of the present invention.

Thus, the present invention is directed to a process for preparing a pattern for use in making metal castings (e.g., aluminum, brass, bronze, ductile, modular or grey iron, magnesium or steel) which have significantly less residual carbon on the surface which comprises:

(a) adding an amount, effective for the purpose, of a combination of a bromine-attached aliphatic or aromatic flame retardant and optionally dicumyl peroxide to a suspension of vinyl aromatic polymer particles having a molecular weight of about 150,000 to 350,000 and having a bead size between 100 and 600 microns in diameter; and (b) adding a suitable blowing agent to the beads and heating to impregnate the beads.

By bromine-attached aliphatic or aromatic flame retardant, it is meant an organic bromine compound having more than 40% by weight bromine and not more than 80% by weight bromine. From about 0.20 to 1.2 parts by weight of flame retardant per 100 parts by weight of vinyl aromatic polymer particles is needed to be effective. Optionally, from about 0.01 to 0.20 percent of the dicumyl peroxide material is added to the system in need of treatment. However, it can be envisioned that a range of up to 5.0 wt. % flame retardants may be required in certain instances to reduce the carbon defects to an insignificant amount.

Suitable blowing agents are, e.g., butane, n-pentane, isopentane, cyclopentane, hexanes, cyclohexane, carbon dioxide, fluorinated hydrocarbons and mixtures thereof. The combination of the bromine-attached aliphatic or aromatic flame retardants and optionally dicumyl peroxide may be added to the suspension as well as the blowing agent.

A number of brominated fire retardant materials are effective for purposes of the present invention. The HBCD to be used as the fire-retardant agent in the process of this invention can be any of the hexabrominated derivatives of cyclododecatriene. Any of the isomers of hexabromocyclododecane are suitable for use. Mixtures of different isomers of hexabromocyclododecane can also be employed. The average particle size of the hexabromocyclododecane may be less than about 100 microns, and is preferably less than about 25 microns. HBCD is available commercially from Ameribrom, Inc., Albermarle Corp. ("SAYTEX HBCD"), and Great Lakes Chemical Corp. ("CD-75P").

The fire-retardant expandable vinyl aromatic polymer beads produced by the process of this invention may be readily shaped into molded foam articles by heating in molds which are not gastight when closed. The beads expand to form prepuff which after aging can be steamed and fused together to form the molded article. Such methods of preparing molded-bead foams are well-known and are described, for example, in Ingram et al, "Polystyrene and Related Thermoplastic Foams" Plastic Foams, Marcel Dekker (1973), Part II, Chapter 10, pp.531–581, Ingram "Expandable Polystyrene Processes" *Addition and Condensation Polymerization Process* American Chemical Society (1969), Chapter 33, pp. 531–535.

Molded foam articles prepared using the fire-retardant expandable vinyl aromatic beads of this invention are resistant to flame, even when relatively low levels of the flame retardant (e.g., hexabromocyclododecane and others) are present. The hexabromocyclododecane is incorporated with the beads rather than coated on the surface of the beads and thus does not interfere with the fusion of the beads when they are expanded into molded foam articles. The density, tensile strength, heat resistance and other physical and mechanical properties of the foams are unaffected by the presence of the hexabromocyclododecane if the process of this invention is employed.

Without further elaboration, it is believed that one skilled in the art can, using the preceding description, utilize the present invention to its fullest extent. The following examples, therefore, are to be considered as merely illustrative and not limitative of the claims or remainder of the disclosure in any way whatsoever.

DESCRIPTION OF THE PREFERRED EMBODIMENTS

An object of the present invention is to completely eliminate any folds in lost foam castings. In the testing of the present invention, a box pattern is molded from EPS (expandable polystyrene) prepuff, conditioned, and coated with a ceramic finish. The coated EPS patterns are glued in clusters to a sprue which is then placed in a flask, and sand is compacted around it. The box pattern is gated to allow the converging metal, Aluminum 319 alloy at 1350° F., to fill the patterns. The placement of the gating in the box pattern is done to maximize fold defects from converging metal fronts in the casting.

The EPS bead, created in a two-step process, has a molecular weight of approximately 240,000, a bead size distribution ranging from 250 to 500 microns, and a pentane blowing agent.

The first step in a two-step process is the polymerization of styrene using benzoyl peroxide as an initiator. The suspension process is carried out in water in a stirred reactor using tricalcium phosphate (TCP) as a suspending agent and sodium dodecyl benzenesulfonate as an anionic surfactant to keep the styrene droplets from coalescing when they form discrete particles of polystyrene beads. A secondary initiator such as t-butyl perbenzoate is used to reduce the unreacted styrene to less than 1000 ppm in a secondary cure cycle.

The second step of the two-step process is to suspend the polystyrene beads in water while carrying out an impregnation using pentane as the blowing agent near or above the softening point of the polystyrene. The impregnated beads are commonly known as EPS.

T24 polystyrene beads, the feedstock used to make T170B, a commercially available expandable polystyrene bead which is used for lost foam production, were impregnated with pentane containing various brominated organic additives, discussed below. The EPS manufactured in this way has the same molecular weight and bead size distribution as the starting material.

Five commonly used flame retardants in the modified grade of EPS are shown in Table 1, below. The flame retardants are incorporated usually in levels less than 1.0 wt %. In some cases, a relatively high temperature peroxide, such as dicumyl peroxide, is added during the impregnation cycle along with the flame retardant. Dicumyl peroxide acts as a synergist and allows the use of less flame retardant while giving the same level of protection during a fire. Other organic peroxides can be used if the decomposition half-life is greater than 2 hours at 100° C., for instance, Vulcup R [α, α'-bis (t-butylperoxy) diisopropylbenzene].

TABLE 1

| Product | Chemical Name | Synergist |
| --- | --- | --- |
| A | Tetrabromocyclooctane | Dicumyl peroxide |
| B | Dibromoethyl dibromocyclohexane | Dicumyl peroxide |
| C | Hexabromocyclododecane | Dicumyl peroxide |
| D | Tetrabromophenol A bis (allyl ether) | None |
| E | 2,4,6-Tribromophenyl allyl ether | None |

While one of the purposes of the flame retardant in EPS is to generate HBr while being heated at elevated temperatures, a more important function is to generate free radicals which reduce the polystyrene molecular weight so that the material quickly can liquefy. This can be verified by running melt index experiments using ASTM D-1238, run under condition G using a weight of 4900 g at 200° C. with and without flame retardants. In the presence of active flame retardants or peroxides, the melt flow of the extrudate will come out like water, while the control will flow like molasses.

The general procedure for making a control was as follows: 235 pounds of water and 235 pounds of T24 polystyrene beads were added to a 50 gallon reactor being stirred at 250 RPM; 474 g of TCP, 29 g of sodium dodecyl benzenesulfonate, and 160 g of Triton® X-102 (alkylaryl polyether alcohol), a nonionic surfactant having an HLB value of 15, were then added. Suitable nonionic surfactants have an HLB value ranging from 12 to 18.

The reactor was heated from room temperature to 225° F. at a rate of 8° F. every 5 minutes. The reactor was purged three times with nitrogen and the pentane was added starting at 125° F. at a rate of 1.5 lb every five minutes. A total of 20 pounds was used. When the temperature reached 225° F., it was kept at this temperature for three hours. The reactor was then cooled to 110° F. and the contents were emptied into a batch out tank containing water and hydrochloric acid (HCl). The contents were acidified to a pH of around 2.0 to remove TCP. The beads were dried by passing them through a dryer and screened to remove any agglomerated beads. Each hundred pounds of dry beads were then treated with 10 grams of silicone oil.

The same procedure was followed when adding brominated organic additives during the impregnation of the polystyrene beads. Thus, for run 3,320 g of dicumyl peroxide was added. For run 4,725 g of HBCD was added.

EPS box patterns were prepared from the EPS beads made in runs 1 to 9. The EPS parts were conditioned and then dipped into a ceramic coating. After drying, the parts were glued in clusters to a sprue and then placed in a flask. Sand was compacted around them. Aluminum 319 alloy was poured into the patterns at 1350° F., and afterward the parts were examined for folds.

Control runs 1 and 2 were poured at different times and resulted in average fold defect values of 26 and 34 mm$^2$. Twenty castings were poured for control run 1, while ten castings were poured for control run 2, each casting containing two box patterns. EPS does not depolymerize cleanly back to 100% monomeric styrene, as does methyl methacrylate from polymethyl methacrylate. The amount varies from 70 to 75% depending on the actual conditions used during the depolymerization (around 400° C.). Thus, each time decomposition of the polystyrene occurs, the results will be different in terms of the amount of gases, styrene, and other liquid and solid residues being generated. At higher temperatures used for pouring aluminum, the amount of styrene decreases and the formation of carbon, methane, and hydrogen are prevalent.

Run 3, using 0.30 wt. % dicumyl peroxide as the additive, resulted in a high concentration of folds, 52 mm$^2$, nearly twice as many per area as the control. To retard fold formation, the ceramic coating must provide a physical barrier between the metal front and the sand. The coating allows for the removal of gas decomposition products at a controlled rate to escape into the sand. In addition, the coating assists in the removal of styrene and other liquid decomposition products by wicking the liquids into the sand. If there is solid residue from the decomposition of polystyrene, it will be trapped as the metal flows and displaces the polystyrene. If the additive is ineffective, as it is for this run, the additive helps to form "globs" of polystyrene residue which accumulate and lead to folds as the metal front converges.

Runs 4 and 5 used 0.68 wt. % HBCD from two different manufacturers. Although HBCD exists in three isomeric forms, the isomer content is not important in reducing fold defects, as the fold areas were identical (4 mm$^2$). The above additive (HBCD) allows for a complete breakdown of the polystyrene into liquid and gaseous products faster and more consistently than some other additives.

Run 6 shows that using 0.30 wt. % dicumyl peroxide with 0.68 wt. % HBCD resulted in nearly as many folds per area as the control. Run 7 using 0.10 wt. % dicumyl peroxide with 0.68 wt. % HBCD resulted in the disappearance of nearly all folds.

Run 8, which had a reduced HBCD level from 0.68 to 0.40 wt. %, showed an increase in the fold area from 4 to 9 mm$^2$, but was still much less than the control.

Run 9 showed that adding product D to HBCD increased the fold area. Thus in this application, product D is not beneficial.

TABLE 2

Aluminum Casting Results-Runs 1 to 9
(Control and Various Additives)

| Run # | Flame Retardant | Synergist | Average Fold Area mm$^2$ | % Flame Retardant Incorp. |
|---|---|---|---|---|
| 1 | None | None | 26 | |
| 2 | None | None | 34 | |
| 3 | None | dicumyl peroxide (0.3 wt. %) | 52 | |
| 4 | HBCD (0.68 wt. %) | None | 4 | |
| 5 | HBCD (0.68 wt. %) | None | 4 | |
| 6 | HBCD (0.68 wt. %) | dicumyl peroxide (0.3 wt. %) | 23 | |
| 7 | HBCD (0.68 wt. %) | dicumyl peroxide (0.1 wt. %) | 1 | 95.6 |
| 8 | HBCD (0.40 wt. %) | None | 9 | 95.1 |
| 9 | HBCD (0.50 wt. %) | Product D (0.2 wt. %) | 10 | |

TABLE 3

Aluminum Casting Results-Runs 10 to 13 (EPS Flame Retardants)

| Run % | Flame Retardant (0.68 wt. %) | Average Fold Area mm$^2$ | % Flame Retardant Incorp. |
|---|---|---|---|
| 10 | Product D | 11 | 95.3 |
| 11 | Product A | 0 | 76.9 |
| 12 | Product B | 6 | 55.0 |
| 13 | Product E | 7 | 81.3 |

Runs 10 to 13 were better than the control in reducing the fold area. Run 11 had no folds in any of the 10 castings, and gave the best results of any of the flame retardants tested. Tetrabromocyclooctane is very effective in quickly reducing the molecular weight of polystyrene at elevated temperatures in a consistent manner. The by-products, liquids and gases, pass through the coating efficiently during the metal pour resulting in converging metal fronts having no carbon defects.

TABLE 4

Aluminum Casting Results-Runs 14 to 15 (Other Flame Retardants)

| Run # | Flame Retardant (0.68 wt %) | Average Fold Area mm$^2$ | Chemical Name | % Flame Retardant Incorp. |
|---|---|---|---|---|
| 14 | Product F | 28 | Decabromodiphenyl oxide | 75.0 |
| 15 | Product G | 55 | Octabromodiphenyl oxide | 89.8 |

Run 14 produced a similar folding area compared to that of the control. Run 15 nearly twice as many folds as the control.

In order to further demonstrate the effectiveness of the present invention, the seven flame retardants shown in the table below were subjected to TGA (thermal gravimetric analysis) under N2 at 10° C. per minute. The shape of the curve was instructive; products A, B, C and E, all decompose sharply by 305° C. Products F and G decompose above 390° C. Product D decomposes incompletely from 200 to 500° with 80% loss at 264° C.

TABLE 5

| Product | ° C. | % Wt. Loss | Average Fold Area mm$^2$ |
|---|---|---|---|
| A | 294 | 100 | 0 |
| B | 277 | 100 | 6 |
| C | 303 | 100 | 4 |
| D | 264 | 80 | 11 |
| E | 244 | 96 | 7 |
| F | 396 | 100 | 56 |
| G | 422 | 100 | 28 |

EPS beads containing Products A, B, C and E produced casting with the smallest areas of fold defects. Product D gave the least effective results, but was still more effective than the control.

TGA decomposition is a good indicator of whether the flame retardant will decrease fold defects. This could be due to the fact that product D does not decompose quickly over a short temperature range. By not decomposing, it added to the residue being generated during the process and increases the fold area. Globs of material which do not decompose cleanly would be expected to accumulate as the metal front rises to the surface, and remain there after a pour as a carbon defect.

Products F and G, which decompose above 390° C., gave more folds than the other flame retardants. While product G is similar to the control in fold area, use of product F resulted in nearly twice as many folds as the controls.

The above results indicate that these flame retardants are too stable, i.e., by not decomposing at a much lower temperature, they add to the residue being generated during the process. Note that these two flame retardants are not used as flame retardants for EPS, but are used successfully in high impact polystyrene to reduce flammability. It is apparent that only those flame retardants which are commonly used as flame retardants for EPS, other than product D, will significantly reduce fold formation in patterns used in the lost foam process.

While this invention has been described with respect to particular embodiments thereof, it is apparent that numerous other forms and modifications of this invention will be obvious to those skilled in the art. The appended claims in this invention generally should be construed to cover all such obvious forms and modifications which are within the true spirit and scope of the present invention.

What is claimed is:

1. A process for preparing a pattern for use in making metal castings which have significantly less residual carbon on the surface of the metal casting comprising:
   (a) adding an amount, effective for the purpose, of a combination of a bromine-attached aliphatic or aromatic flame retardant, and optionally, dicumyl peroxide to a suspension of vinyl aromatic polymer particles having a molecular weight of about 150,000 to 350,000 and having a bead size between 100 and 600 microns in diameter; and
   (b) adding a suitable blowing agent to the beads and heating to impregnate the beads, wherein said surface is selected from the group consisting of aluminum, brass, bronze, ductile iron, modular iron, grey iron, magnesium and steel, wherein the beads are polymerized and suspended in water prior to (a).

2. The process as recited in claim 1 wherein from about 0.01 to 0.20 weight percent of the dicumyl peroxide is added to the suspension of vinyl aromatic polymer particles.

3. The process as recited in claim 1 wherein said suitable blowing agent is selected from the group consisting of butane, n-pentane, isopentane, cyclopentane, hexanes, cyclohexane, carbon dioxide, fluorinated hydrocarbons and mixtures thereof.

4. The process as recited in claim 1 wherein the vinyl aromatic polymer has a molecular weight of about 170,000 to 320,000.

5. The process as recited in claim 1 wherein the vinyl aromatic polymer has a bead size between about 150 and 500 microns.

6. The process as recited in claim 1 wherein the flame retardant is selected from the group consisting of hexabromocyclododecane and tetrabromocyclooctane, in an amount from about 0.20 to 5.0 weight %.

7. The process as recited in claim 1 wherein said suitable suspending agent system is a finely divided tricalcium phosphate, an anionic surfactant, and a nonionic surfactant having an HLB value ranging from 12 to 18.

8. The process as recited in claim 1 wherein said vinyl aromatic polymer particles are polystyrene particles.

9. A process for preparing a pattern for use in making metal castings which have significantly less residual carbon on the surface of the metal casting comprising:
   (a) adding an amount, effective for the purpose, of a combination of (1) a flame retardant selected from the group consisting of hexabromocyclododecane and tetrabromocyclooctane (2) dicumyl peroxide to a suspension of a polystyrene having a molecular weight of about 150,000 to 350,000 and having a bead size between 100 and 600 microns in diameter; and
   (b) adding a suitable blowing agent to the beads and heating to impregnate the beads, wherein said surface is selected from the group consisting of aluminum, brass, bronze, ductile iron, modular iron, grey iron, magnesium and steel, wherein the beads are polymerized and suspended in water prior to (a).

10. The process as recited in claim 9 wherein from about 0.01 to 0.20 weight percent of the dicumyl peroxide is added to the suspension of polystyrene.

11. The process as recited in claim 9 wherein said suitable blowing agent is selected from the group consisting of butane, n-pentane, isopentane, cyclopentane, hexanes, cyclohexane, carbon dioxide, fluorinated hydrocarbons and mixtures thereof.

12. The process as recited in claim 9 wherein the combination of from about 0.20 to 5.0 weight % of (a) flame retardant selected from the group consisting of hexabromocyclododecane and tetrabromocyclooctane (b) dicumyl peroxide is added to the suspension before impregnation is complete.

13. The process as recited in claim 9 wherein the polystyrene has a molecular weight of about 170,000 to 320,000.

14. The process as recited in claim 9 wherein the polystyrene has a bead size between about 150 and 500 microns.

* * * * *